(12) United States Patent
Yun

(10) Patent No.: US 11,613,172 B2
(45) Date of Patent: Mar. 28, 2023

(54) BATTERY RELEASE SYSTEM FOR VEHICLE

(71) Applicants: Hyundai Motor Company, Seoul (KR); Kia Motors Corporation, Seoul (KR)

(72) Inventor: Gi Sang Yun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 351 days.

(21) Appl. No.: 16/936,746

(22) Filed: Jul. 23, 2020

(65) Prior Publication Data

US 2021/0284005 A1 Sep. 16, 2021

(30) Foreign Application Priority Data

Mar. 11, 2020 (KR) .................. 10-2020-0029924

(51) Int. Cl.
*B60K 1/04* (2019.01)
*H01M 10/42* (2006.01)
(Continued)

(52) U.S. Cl.
CPC ............... *B60K 1/04* (2013.01); *G08B 17/00* (2013.01); *H01M 10/425* (2013.01);
(Continued)

(58) Field of Classification Search
CPC .............. B60K 1/04; B60K 2001/0455; B60K 2001/0405; B60K 2001/0461; B60K 2001/0438; B60K 2001/0472; B60K 2001/0488; B60S 5/06; B60Y 2200/14; B60Y 2200/91; B60Y 2200/90; B60Y 2200/92; B60Y 2306/01; B60Y 2300/92; B60Y 2400/11; B60Y 2400/112; B60Y 2400/30; B60Y 2400/302; B60Y 2400/3042; B60Y 2400/308; B60L 3/0007; B60L 3/0046; B60L 3/0069; B60L 3/0038; B60L 3/0092; B60L 3/00; B60L 3/0084; B60L 3/04; B60L 2200/18; B60L 53/80;
(Continued)

(56) References Cited

U.S. PATENT DOCUMENTS

| | | | |
|---|---|---|---|
| 7,488,546 B2 * | 2/2009 | Kim ................. | H01M 10/4235 429/96 |
| 7,543,666 B2 * | 6/2009 | Connelly ............ | H01M 50/244 180/68.5 |

(Continued)

*Primary Examiner* — James M Dolak
(74) *Attorney, Agent, or Firm* — Fox Rothschild LLP

(57) ABSTRACT

A system is provided to prevent the burning of a vehicle or human injury caused by a fire spread from a battery to a vehicle in the event of a fire in the battery. The battery release system includes a controller that outputs a control signal to release a battery pack from a vehicle to separate the battery pack therefrom when the controller determines that a fire occurs in the battery pack. A mounting structure is rotatably mounted to a body frame and supports the battery pack. A locking device is mounted to the body frame and the locking device locks the mounting structure supporting the battery pack to the body frame, and releases the locked state of the mounting structure in response to the control signal of the controller.

11 Claims, 6 Drawing Sheets

(51) Int. Cl.
    *G08B 17/00* (2006.01)
    *H01M 10/48* (2006.01)
    *H01M 50/20* (2021.01)

(52) U.S. Cl.
    CPC ........... H01M 10/48 (2013.01); H01M 50/20 (2021.01); *B60K 2001/0455* (2013.01); *H01M 2200/00* (2013.01)

(58) Field of Classification Search
    CPC .... G08B 17/00; H01M 10/425; H01M 10/48; H01M 10/42; H01M 10/486; H01M 2200/00; H01M 2220/20; H01M 50/20; H01M 50/209; H01M 50/249; H01M 50/262; H01M 50/264; H01M 50/204; H01M 50/202; H01M 50/242; H01M 50/244; H01M 50/383; H01M 50/572; H01M 50/581
    See application file for complete search history.

(56) References Cited

U.S. PATENT DOCUMENTS

| | | | | |
|---|---|---|---|---|
| 8,276,698 | B2 * | 10/2012 | Guss | B60L 50/66 |
| | | | | 180/68.5 |
| 8,517,131 | B2 * | 8/2013 | Kovach | B60L 50/64 |
| | | | | 180/68.5 |
| 8,733,465 | B1 * | 5/2014 | Flood | H01M 50/213 |
| | | | | 169/56 |
| 8,889,277 | B2 * | 11/2014 | Lakamraju | E05B 17/0075 |
| | | | | 70/277 |
| 8,936,124 | B2 * | 1/2015 | Auer | B60L 50/64 |
| | | | | 180/68.5 |
| 9,083,064 | B2 * | 7/2015 | LePort | H01M 10/42 |
| 9,248,746 | B2 * | 2/2016 | Wen | H01M 10/488 |
| 9,267,993 | B2 * | 2/2016 | Farmer | H01G 11/10 |
| 9,539,448 | B2 * | 1/2017 | Jung | A62C 3/16 |
| 9,630,483 | B2 * | 4/2017 | Yamada | B60K 1/04 |
| 9,954,259 | B1 * | 4/2018 | Grace | B60L 58/25 |
| 10,035,032 | B2 * | 7/2018 | Li | A62C 3/16 |
| 10,559,858 | B2 * | 2/2020 | Goitsuka | H01M 50/298 |
| 10,777,856 | B2 * | 9/2020 | Stachewicz | H01M 10/488 |
| 10,892,469 | B2 * | 1/2021 | Werner | H01M 10/425 |
| 10,960,246 | B2 * | 3/2021 | Stadler | B60L 50/64 |
| 11,083,918 | B2 * | 8/2021 | Wlodarczyk | A62D 1/0092 |
| 11,444,352 | B2 * | 9/2022 | Lacovoni | B60K 1/04 |
| 11,465,482 | B2 * | 10/2022 | Menon | B60L 50/66 |
| 11,509,010 | B2 * | 11/2022 | Guttrich | H01M 50/20 |
| 11,541,738 | B2 * | 1/2023 | Menon | H01M 50/207 |
| 11,552,245 | B2 * | 1/2023 | Lin | H01L 45/1253 |
| 2015/0132616 | A1 * | 5/2015 | Sahner | H01M 10/4257 |
| | | | | 429/61 |
| 2016/0279453 | A1 | 9/2016 | Ernfjall | |
| 2018/0159110 | A1 * | 6/2018 | Tuomola | H01M 10/4257 |

* cited by examiner

BATTERY RELEASE SYSTEM FOR VEHICLE

CROSS REFERENCE TO RELATED APPLICATION

The present application claims priority to Korean Patent Application No. 10-2020-0029924, filed Mar. 11, 2020, the entire contents of which is incorporated herein for all purposes by this reference.

BACKGROUND

Field of the Disclosure

The present disclosure relates to a battery release system for a vehicle, and more particularly, to a battery release system in which a battery is automatically released from a vehicle and separated therefrom in an emergency.

Description of the Related Art

Due to environmental regulations around the world, the spread of eco-friendly vehicles driven by a motor is increasing. Such eco-friendly vehicles include a hybrid electric vehicle (HEV), a battery electric vehicle (BEV), a fuel cell electric vehicle (FCEV), etc. A plug-in HEV (PHEV) is known as the hybrid electric vehicle, and the PHEV and the BEV are electric vehicles, in which power is received from the outside to charge a battery. These eco-friendly vehicles have common features in that they are provided with a motor as a drive device and with a battery supplying power to the motor.

When a fire occurs in a battery in an eco-friendly vehicle, the fire may spread rapidly due to the internal structure of the battery and components thereof. It is difficult to extinguish a fire occurring in the battery of an eco-friendly vehicle by using the existing fire extinguishing device used in an internal combustion engine vehicle. Briefly explaining the existing fire extinguishing method of the internal combustion engine vehicle, in the internal combustion engine vehicle, fuel, which is a flammable material, is used, and there are a number of heat sources, and various electric wiring is entangled, so there is always a risk of fire.

For example, since the engine room is equipped with a high-temperature engine and various electric devices, a fire may occur if the engine and the electric devices are damaged and if malfunction occurs due to a vehicle collision. In addition, there is a risk of fire in the engine room during driving of the vehicle due to engine overheating or during exhaust gas post-treatment. As a method of responding to a fire in a vehicle, a responding method to the extent that a fire extinguisher is provided is widely known. If a driver fails to use the fire extinguisher in time, initial fire extinguishing may fail and the fire may spread throughout the vehicle.

Moreover, public transportation vehicles such as buses have many passengers on board, and thus, fire prevention management for passenger safety is essential, and the failure of an initial response to a fire may lead to major catastrophes. In addition, since a driver is indoors while driving a vehicle, it is often impossible to notice a fire quickly before a substantial amount of smoke is generated when a fire occurs inside the engine room. Unlike a passenger vehicle, a bus has an engine room located at the rear thereof, so it is difficult for a driver to notice a fire occurring in the engine room of the bus. Accordingly, in the early stage of a fire, a driver is unable to perform rapid fire extinguishing, and the fire may spread, which leads to the burning of the vehicle and the increase of the risk of human injury.

In addition, even when a driver or passenger inside the vehicle rapidly recognizes the occurrence of a fire, it is difficult to rapidly extinguish the fire in an early stage using only a small fire extinguisher provided in the vehicle. Accordingly, a fire extinguishing system is known in which a fire extinguishing agent is automatically sprayed toward an ignition point when a fire is detected in the engine room of a vehicle to rapidly extinguish the fire in an early stage.

In the known engine room fire extinguishing system, when a fire occurs in the engine room, a fire detection signal is transmitted thereto and high-pressure nitrogen charged in the nitrogen tank is supplied to a cylinder filled with a fire extinguishing agent through a hose. Accordingly, in the cylinder, while a piston is operated by the high-pressure nitrogen, the internal fire extinguishing agent is supplied to an injection line at a high pressure by the pushing force of the piston, and eventually the fire extinguishing agent is sprayed to an ignition point through the nozzle of the injection line to extinguish the fire.

However, although the fire extinguishing system described above is useful for automatically extinguishing a fire by automatically spraying the fire extinguishing agent in a vehicle's engine room or other space in a vehicle, it is difficult to apply the system to extinguishing a fire occurring in a battery pack of an eco-friendly vehicle. In general, in the case of a battery pack, it is known that it is almost impossible to extinguish a fire by simply spraying water or a fire extinguishing agent thereto when a fire occurs.

The battery pack contains igniting substances in a closed inner space thereof and battery cells forming the battery pack contain substances having a substantial amount of oxygen thereinside. Accordingly, due to the oxygen remaining inside the battery pack, it is difficult to completely extinguish a fire by using water or spraying fire extinguishing agents (e.g., fire extinguishing powder or fire extinguishing liquid) in a conventional internal combustion engine vehicle when the fire occurs in the battery pack.

Accordingly, when a fire occurs in the battery of a vehicle, the fire may not be completely extinguished, and the fire may spread to the vehicle after a period of time. Recently, as the use of eco-friendly vehicles has increased, the risk of fire has increased due to external shock or internal short circuit in the battery or surrounding high voltage electric wiring. However, until now, there is no technology to prevent a fire occurring in a battery from spreading to the entire vehicle, thus increasing the risk of burning a vehicle or human injury.

SUMMARY

Accordingly, the present disclosure provides a technology that may prevent the burning of a vehicle or human injury caused by a fire occurring in a battery. According to an exemplary embodiment of the present disclosure, a battery release system for a vehicle may include: a controller configured to output a control signal to release a battery pack from a vehicle such that the battery pack is separated therefrom when the controller determines that a fire occurs in the battery pack; a mounting structure rotatably mounted to a body frame and provided to support the battery pack, the mounting structure being rotated relative to the body frame by weight of the battery pack during the release of the battery pack; and a locking device mounted to the body frame, the locking device locking the mounting structure supporting the battery pack to the body frame to hold the mounting structure thereon, and operated to release the locked state of the mounting structure in response to the control signal of the controller to perform the rotation of the mounting structure and the release of the battery pack.

The battery release system according to the exemplary embodiment of the present disclosure may further include: a fire detection sensor configured to detect a fire occurring in the battery pack. The controller may be configured to determine whether a fire occurs in the battery pack based on a signal of the fire detection sensor. In addition, the mounting structure may include: a support that supports the battery pack, and provided to release the battery pack therefrom by being rotated when a state of the support locked by the locking device is released; a first mounting part rotatably coupling a lower part of the support to the body frame; and a second mounting part holding an upper part of the support on the body frame while being locked to the locking device and allowing the state of the support held on the body frame to be released during the release of the state of the support locked by the locking device.

In particular, the support may be an L-shaped support in which a horizontal member having a plate shape and a vertical member having a plate shape are connected integrally to each other, with the battery pack being seated on the horizontal member Additionally, a lower part of a vertical member may be rotatably coupled to the body frame by the first mounting part, an upper part of the vertical member being held on the body frame while locked to the locking device, or the state of the upper part held on the body frame being released when the state of the upper part locked by the locking device is released.

Furthermore, the mounting structure may further include: a strap that connects the support to the locking device therebetween and provided to surround the battery pack, the strap holding the battery pack on the support while being locked to the locking device by being combined therewith, and releasing the state of the battery pack held on the support while the strap is separated from the locking device when the state of the strap locked by the locking device is released. In particular, a plurality of straps may be provided and a first end part of each of the straps may be coupled to the support and a second end part of each of the straps may be coupled to the locking device to lock the strap thereto.

In addition, the second mounting part may include: a seating part provided on an upper part of the support to protrude rearward therefrom, and coupled to the locking device to be locked thereto, and a bracket part fixed to the body frame and supporting the seating part, with the seating part seated on the bracket part. The seating part may include a holding jaw part provided thereon to be held by a hook of the locking device, the hook of the locking device being combined with the holding jaw part of the seating part by being held thereby to thus lock the seating part to the locking device.

Furthermore, a lower surface of the seating part may be formed as a curved surface, and an upper surface of the bracket part may be formed as a curved surface to which the lower surface of the seating part is joined, and thus, when the seating part is seated on the bracket part, the curved surfaces of the seating part and the bracket part may be joined to each other. In addition, the locking device may include: the hook rotatably mounted to the body frame, and by which the holding jaw part provided in the mounting structure is held to be locked thereto; and an actuator fixedly mounted to the body frame and forcibly rotating the hook maintaining the locked state of the holding jaw part by using the control signal output from the controller to a position of the hook by which the locked state of the holding jaw part is released.

Additionally, in the exemplary embodiment, when the controller determines that the vehicle is in a stopped state while the controller determines that a fire occurs in the battery pack, the controller may be configured to output the control signal to release the battery pack from the vehicle to separate the battery pack therefrom. According to the battery release system for a vehicle of the present disclosure, a battery, in which a fire occurs, may be automatically released from a vehicle to be separated and removed therefrom, so the fire occurring in the battery may be prevented from spreading to the vehicle and the vehicle and a driver may be thus safely protected from the battery fire.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Figure 1:
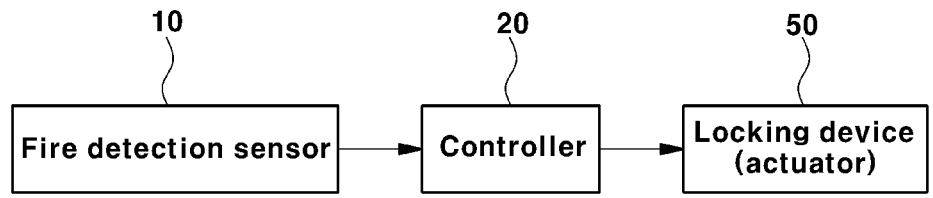
FIG. 1 is a block diagram illustrating the main configuration of a battery release system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, reference will now be made in greater detail to an exemplary embodiment of the present disclosure, an example of which is illustrated in the accompanying drawings such that those skilled in the art can efficiently perform the embodiment of the present disclosure. However, the present disclosure is not limited to the exemplary embodiment thereof and may be variously realized.

The present disclosure is intended to propose a technology that may prevent the burning of a vehicle or human injury caused by the fire of a battery mounted on an eco-friendly vehicle. As described above, in the event of the fire of a battery pack in an eco-friendly vehicle, extinguishing a fire by spraying a fire extinguishing agent into an ignition part has limitations. Accordingly, to prevent the spread of fire to a vehicle, a method of separating the ignition part from the vehicle may be considered, and the separation of the ignition part from the vehicle may protect the vehicle and a driver from the fire.

When a fire occurs in a battery pack in a vehicle, the battery pack may be automatically released from the vehicle to separate and remove the battery pack from the vehicle. Accordingly, the present disclosure relates to a system that is operated in response to a control signal of a controller configured to detect the fire of a battery and release the state of the battery mounted to a vehicle body to release the battery therefrom to separate and remove the battery from a vehicle.

In the present disclosure, the battery may refer to a battery in a battery pack unit, that is, a battery pack. In addition, a battery release system of the present disclosure may be applied to a general passenger vehicle, but is useful when applied to an eco-friendly commercial vehicle, particularly, to a battery electric truck or a hydrogen electric truck equipped with a fuel cell. For a truck, since the battery pack may be mounted to a body frame exposed to the outside without being mounted inside the vehicle, it may be possible to separate and remove the battery pack from the vehicle by removing the battery pack having a fire from the vehicle when the battery release system of the present disclosure is applied.

When initial fire extinguishing fails in the event of a battery fire, human injury may occur. Accordingly, when there is difficulty in the initial fire extinguishing, separating the battery from the vehicle to prevent the fire from spreading to the vehicle may be more effective in preventing the occurrence of human injury than extinguishing the fire of the battery. In other words, since the battery, which may be the source of a fire of a vehicle, may be separated from the vehicle, it may be possible to reliably prevent a more dangerous situation, such as the burning of a vehicle or human injury.

Figure 2:
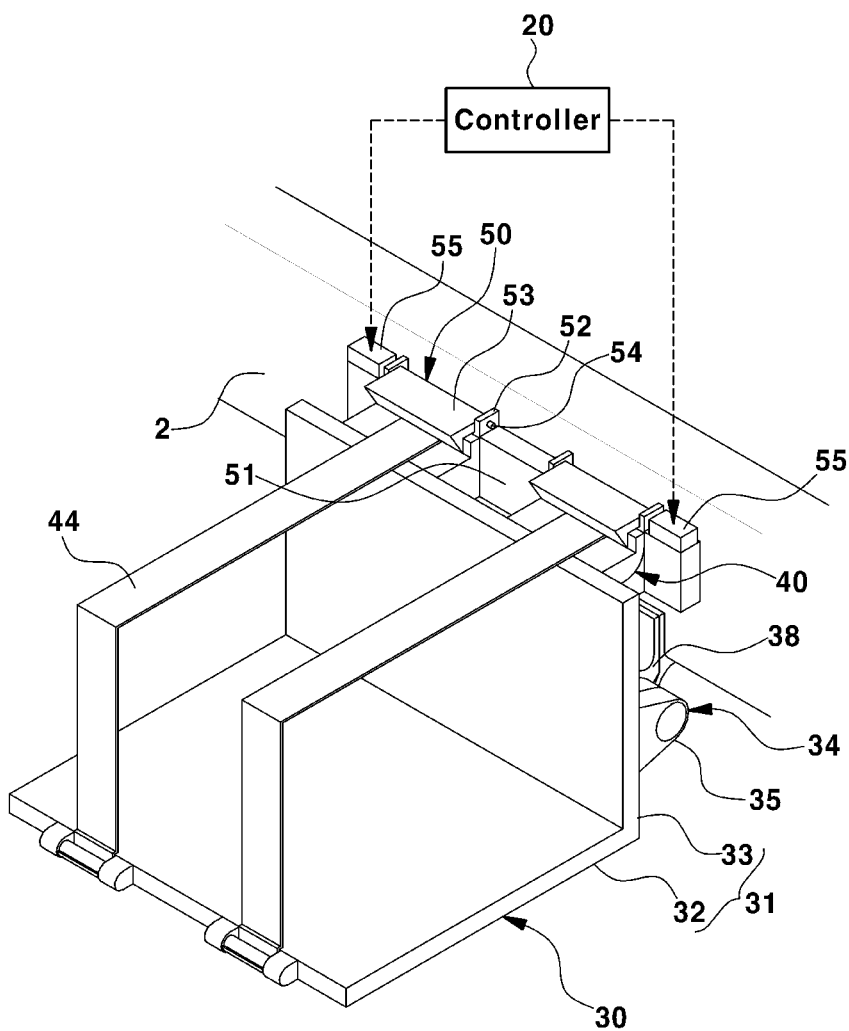
FIG. 2 is a perspective view illustrating the battery release system according to the exemplary embodiment of the present disclosure.

Hereinafter, the configuration of the battery release system according to the exemplary embodiment of the present disclosure will be described in detail with reference to the accompanying drawings. FIG. 1 is a block diagram illustrating the main configuration of the battery release system according to the exemplary embodiment of the present disclosure, and FIG. 2 is a perspective view illustrating the battery release system according to the exemplary embodiment of the present disclosure.

Figure 3:
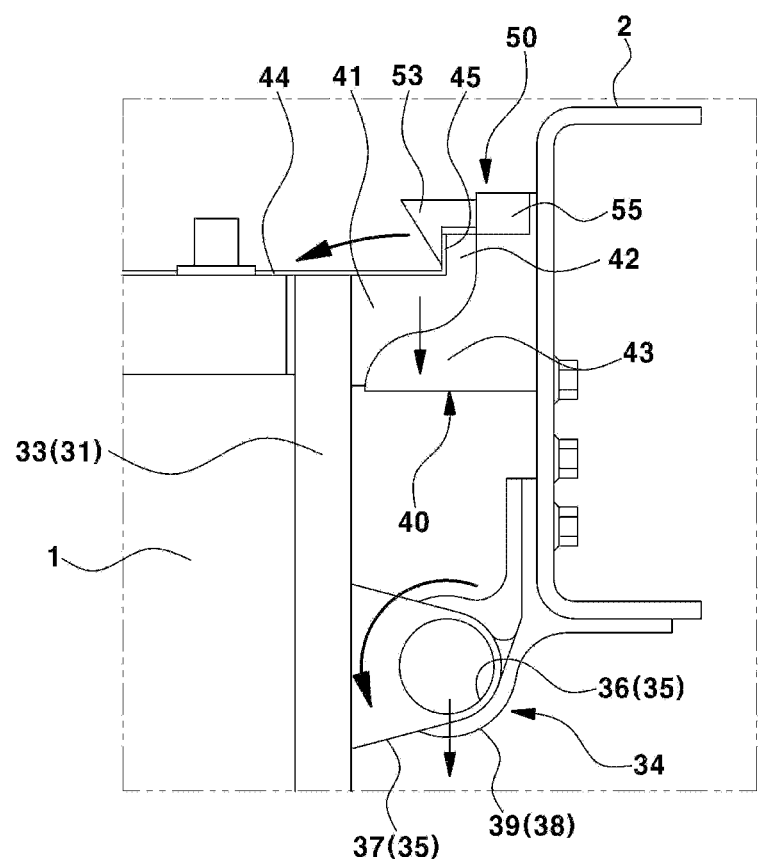
FIG. 3 is a side view illustrating a first mounting part, a second mounting part, and a hook provided in the battery release system according to the exemplary embodiment of the present disclosure.
Figure 4:
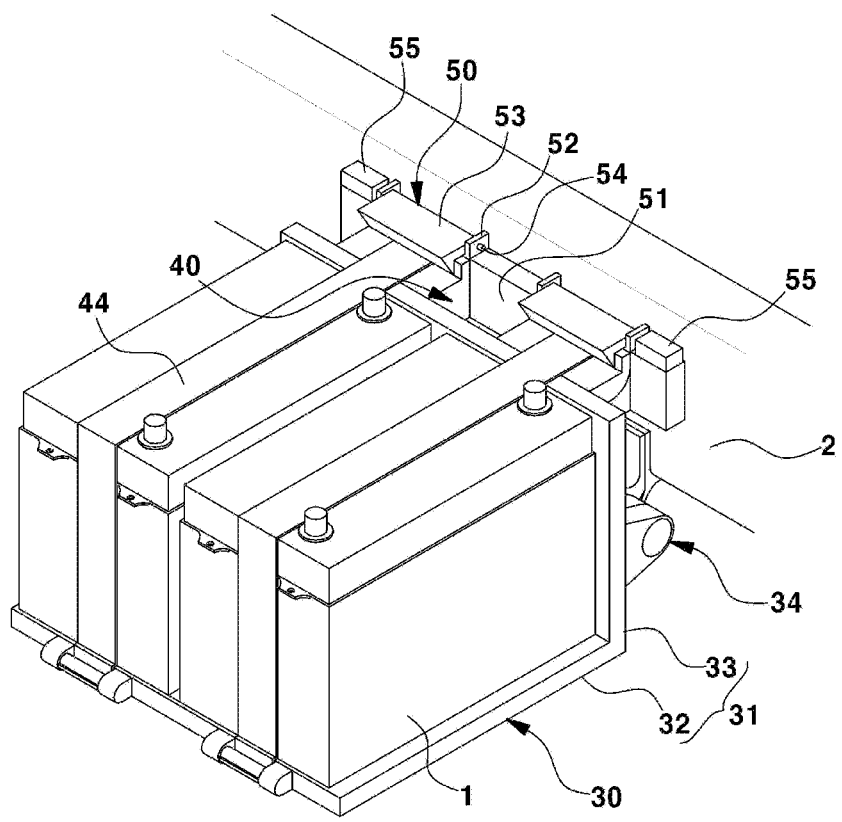
FIG. 4 is a perspective view illustrating a battery pack mounted to a body frame by the battery release system according to the exemplary embodiment of the present disclosure.
Figure 5:
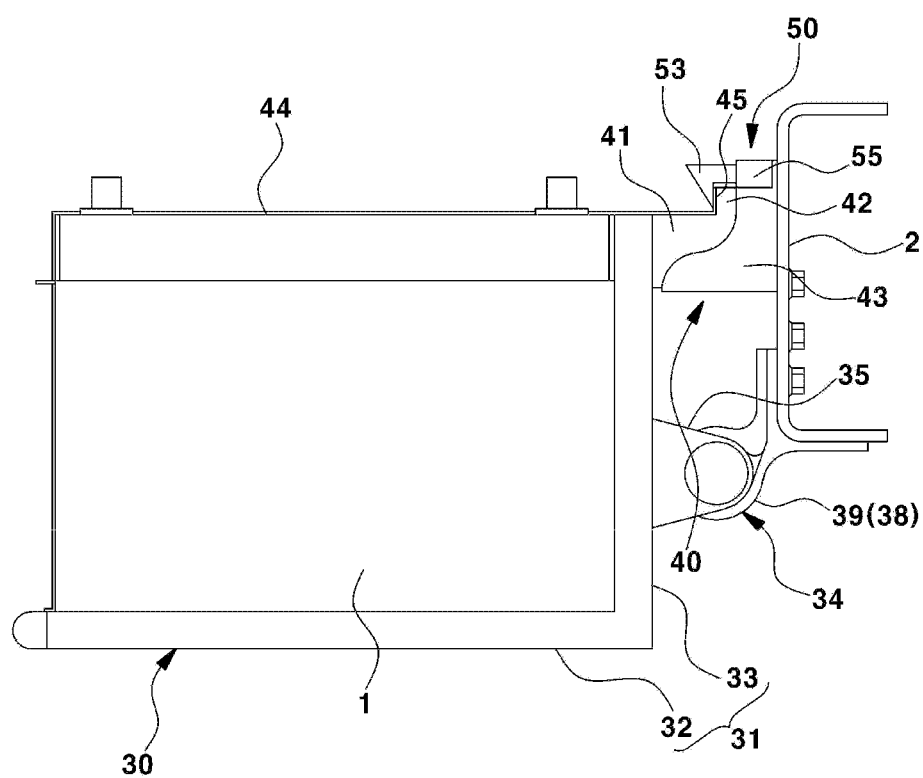
FIG. 5 is a side view illustrating a battery pack mounted to the body frame by the battery release system according to the exemplary embodiment of the present disclosure.

FIG. 3 is a side view illustrating a first mounting part 34, a second mounting part 40, and a hook 53 of a locking device 50 provided in the battery release system according to the exemplary embodiment of the present disclosure, and shows the battery pack 1 mounted to the body frame 2 and a mounting structure 30 locked by the locking device 50. FIG. 4 is a perspective view illustrating the battery pack 1 mounted to the body frame 2 by the battery release system according to the exemplary embodiment of the present disclosure, and FIG. 5 is a side view illustrating the battery pack 1 mounted to the body frame 2.

Figure 6:
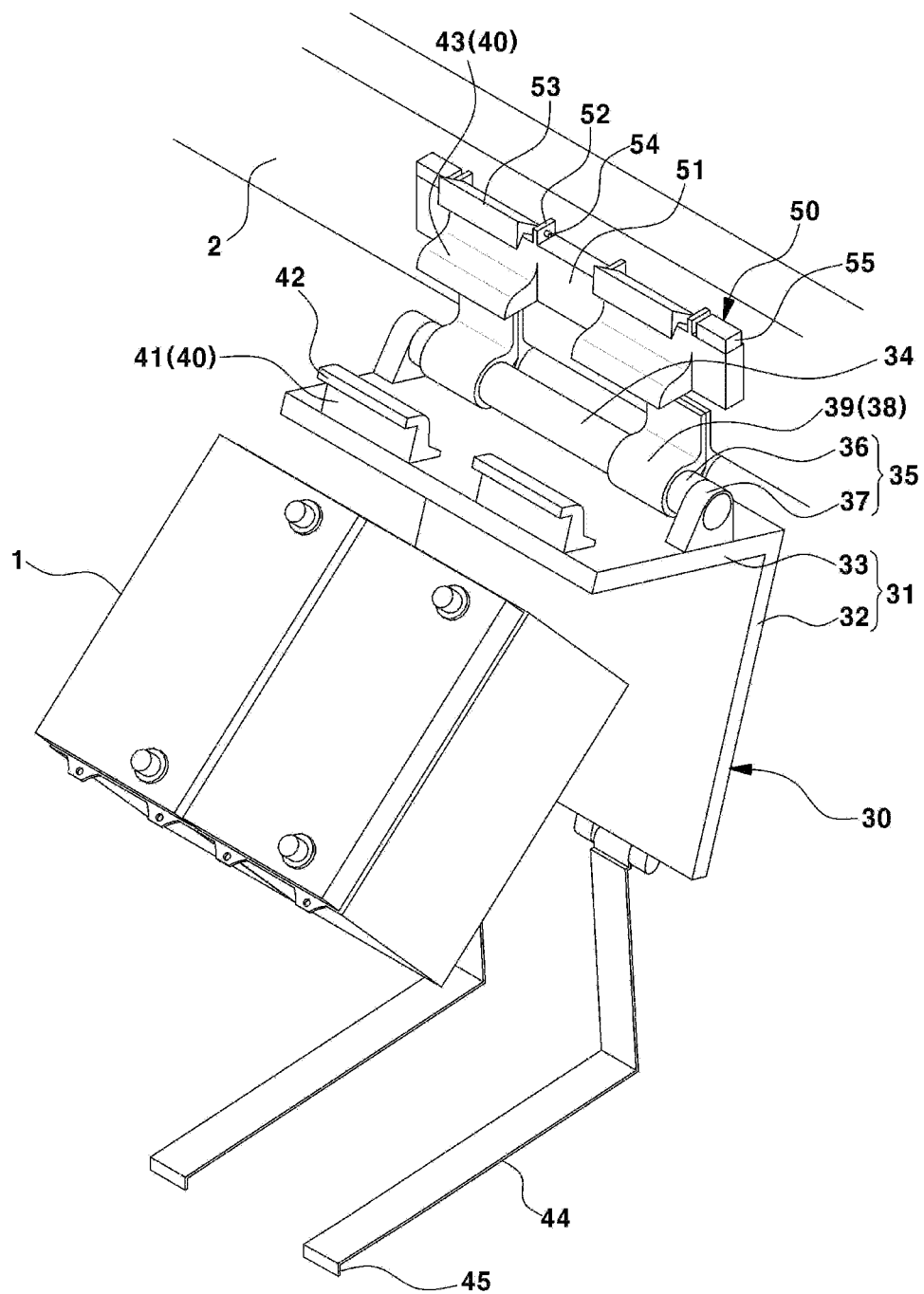
FIG. 6 is a perspective view illustrating the operating state of the battery release system when releasing the battery pack from the battery release system according to the exemplary embodiment of the present disclosure.
Figure 7:
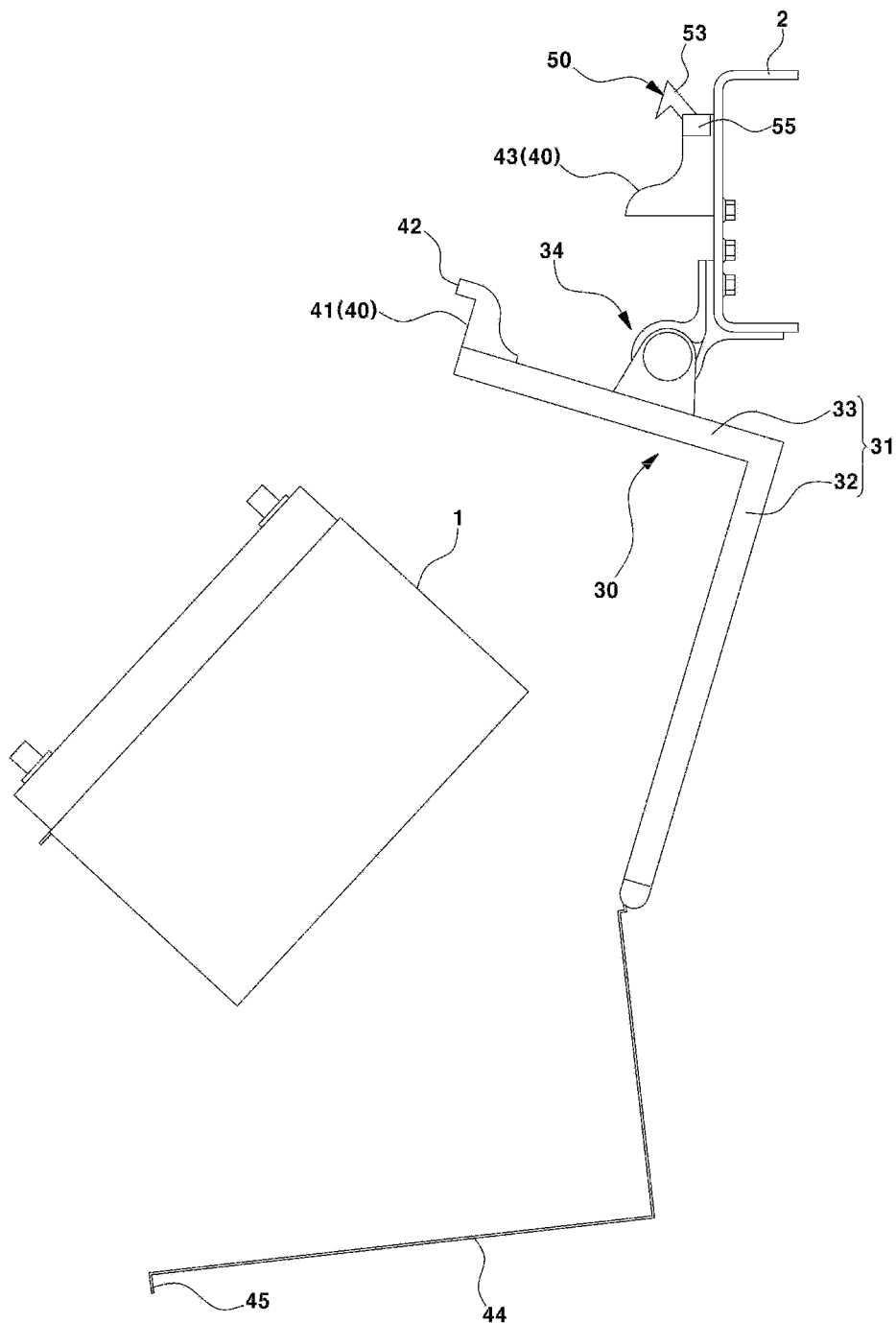
FIG. 7 is a side view illustrating the operating state of the battery release system when releasing the battery pack from the battery release system according to the exemplary embodiment of the present disclosure.

FIG. 6 is a perspective view illustrating the operating state of the battery release system when releasing the battery pack from the battery release system according to the exemplary embodiment of the present disclosure, and FIG. 7 is a side view illustrating the operating state of the battery release system when releasing the battery pack from the battery release system. The battery release system according to the present disclosure may be configured to integrally perform the function of mounting the battery pack 1 to the body frame 2 and the function of releasing the mounting of the battery pack 1 to the body frame 2 and removing the battery pack 1 from a vehicle to separate and remove the battery pack 1 therefrom.

In other words, the battery release system according to the present disclosure may include the controller 20 configured to determine whether a fire occurs in the battery pack 1; the mounting structure 30 provided to support and hold the battery pack 1 therein and rotatably mounted to the body frame 2 for the release of the battery pack; and the locking device 50 mounted to the body frame 2, the locking device locking the mounting structure 30 that supports the battery pack 1 to the body frame 2 such that the mounting structure 30 is held thereon and operated to release the locked state of the mounting structure 30 in response to the control signal of the controller 20 to release of the battery pack 1. In addition, the battery release system according to the present disclosure may further include a fire detection sensor 10 configured to detect the fire of the battery pack 1.

Referring to FIG. 1, the fire detection sensor 10 configured to detect the occurrence of fire in the battery pack 1; the controller 20 configured to determine whether a fire occurs in the battery pack 1 receiving the signal of the fire detection sensor 10; and an actuator of the locking device 50 configured to operate in response to the control signal of the controller 20 are illustrated. In the exemplary embodiment of the present disclosure, the fire detection sensor 10 may be a temperature sensor 10 configured to measure the temperature of the battery pack 1 and output a signal according to the measured value.

The fire detection sensor 10 may be connected to the controller 20 to transmit a signal thereto, and the controller 20 may be configured to receive the signal output from the fire detection sensor 10 and determine whether a fire exists in the battery pack 1 based on the temperature of the battery pack indicated by the signal. In the exemplary embodiment of the present disclosure, the controller 20 may be set to determine that the fire exists in battery pack 1 when the temperature of the battery pack measured by the fire detection sensor 10 is at least a preset reference temperature (e.g., about 170-190 C).

In addition, when the controller 20 determines that a fire has occurred in the battery pack 1, the controller 20 may be configured to output the control signal for the release of the battery pack, and the actuator 55 of the locking device 50 may be configured to perform operation for the release of the battery pack in response to the control signal of the controller 20. When the controller 20 determines that a fire exists the battery pack based on the signal of the fire detection sensor 10, and when vehicle speed satisfies the condition of reference speed or less, the controller 20 may be configured to output the control signal for the release of the battery pack. In particular, the reference speed may be determined as stationary vehicle speed at which a vehicle may be determined to be stopped, for example, 0 km/h. Accordingly, in a fire detected state of the battery pack and the stopped state of a vehicle, the release of the battery pack 1 may be performed.

In the exemplary embodiment of the present disclosure, the mounting structure 30 may include a support 31, which is a structure mounting the battery pack 1 to a side surface of the body frame 2, the support being provided to support the battery pack 1 with the battery pack 1 seated thereon and to release the battery pack 1 therefrom by being rotated during the release of the state of the support locked by the locking device 50; the first mounting part 34 rotatably coupling a lower part of the support 31 to the body frame 2; and the second mounting part 40 holding an upper part of the support 31 on the body frame 2 while being locked to the locking device 50 and allowing the state of the support 31 held on the body frame 2 to be released during the release of the state of the support locked by the locking device 50.

The support 31 may be rotatably coupled to the body frame 2 by the first mounting part 34, may be mounted to the body frame 2 by the second mounting part 40, and may be locked or unlocked by the locking device 50 mounted to the body frame 2. In the exemplary embodiment of the present disclosure, the support 31 may be a support having a plate shape as illustrated in FIG. 2, and particularly, may be an L-shaped support in which a horizontal member 32 having a plate shape and a vertical member 33 having a plate shape are connected integrally to each other.

In such a support 31, the battery pack 1 may be seated on the horizontal member 32, and the first mounting part 34 and the second mounting part 40 may be mounted to the vertical member 33. In particular, the first mounting part 34 is a component that rotatably couples and mounts a lower part of the vertical member 33 to the body frame 2, and the second mounting part 40 is a component that couples an upper part of the vertical member 33 to the body frame 2 and the locking device 50. As described above, when the support 31 is the L-shaped support 31, the mounting structure 30 may further include a strap 44 installed thereto to surround the battery pack 1 seated on the support 31, and the strap 44 connects the support 31 of the mounting structure 30 to the locking device 50 therebetween.

In the exemplary embodiment, a first end part of the strap 44 may be coupled to a front end part of the support 31, particularly, to a front end part of the horizontal member 32 of the support 31, and a second end part of the strap 44, together with the second mounting part 40 of the mounting structure 30, may be coupled to the locking device 50 to be locked thereto and unlocked therefrom. While the strap 44 is locked to the locking device 50, the strap 44 holds the battery pack 1 on the support 31, and while the locked state of the strap 44 by the locking device 50 is released, the strap 44 may be separated from the locking device and the state of the battery pack 1 held on the support 31 may be released. In the exemplary embodiment of the present disclosure, a plurality of straps 44 may be provided to surround the battery pack 1, and all of the plurality of straps 44 surrounding the battery pack 1 function to hold the battery pack 1 on the support 31 to prevent the battery pack 1 from moving thereon.

Referring to FIG. 2, two straps 44 are provided, and in the illustrated exemplary embodiment, the two straps 44 are for illustrative purposes. The battery release system of the present disclosure is not limited to having two straps 44, and the number of the strap may be varied. A first end part of each of the straps 44 may be rotatably coupled to the front end part of the support 31, particularly, to the front end part of the horizontal member 32 of the support 31. In particular, each of the straps 44 may be provided in an L-shape of being bent perpendicularly to a middle part thereof at the middle part.

In addition, each of the straps 44 may include a holding end part 45 provided at a second end part thereof. The holding end part 45 is a part locked to the hook 53 of the locking device 50 by being held thereby, and may have the shape of being bent upwards from the second end part of the strap 44. In the mounting structure 30, the first mounting part 34 may include a mounting member 35 mounted to a rear surface of the lower part of the support 31, particularly, to a rear surface of the lower part of the vertical member 33 of the support 31, and a mounting bracket 38 fixed to the body frame 2 to be coupled to the mounting member 35.

The mounting member 35 of the first mounting part 34 mounted to the support 31 may be rotatably coupled to the mounting bracket 38 mounted to the body frame 2. Accordingly, the entire support 31 may be rotated relative to the mounting member 35. The mounting member 35 is a member operating as a hinge shaft which is the center of the rotation of the support 31, and may be installed on the rear surface of the lower part of the vertical member 33 of the support 31 in the shape of a shaft which longitudinally extends in a direction parallel to the body frame 2.

Particularly, the mounting member 35 may include a shaft part 36 formed in the shape of a long cylinder having a predetermined length or in the rod shape of a circular cross section having a predetermined length, and a support part 37 disposed at opposite end parts of the shaft part 36, the support part being fixed to the rear surface of the vertical member 33 and supporting the shaft part 36, with the shaft part 36 spaced apart from the rear surface of the vertical member 33. The shaft part 36 may be arranged to longitudinally extend in the direction parallel to the body frame 2 to operate as the hinge shaft that is the center of rotation of the support 31.

In addition, a first side of the mounting bracket 38 may be fixed to the body frame 2, and a circular coupling part 39 may be provided at a second side of the mounting bracket 38, the circular coupling part coupled to the shaft part 36, with the shaft part 36 of the mounting member 35 surrounded by the circular coupling part. The first side of the mounting bracket 38 may be fixed to the body frame 2 by bolting or welding, and the shaft part 36 of the mounting member 35 may be inserted into and coupled to the circular coupling part 39 so that the shaft part 36 of the mounting member 35 is rotatable in the coupling part 39 of the mounting bracket 38. In the exemplary embodiment of the present disclosure, a plurality of mounting brackets 38 may be fixed to the body frame 2, and the shaft part 36 of the mounting member 35, which is longitudinally arranged in the direction parallel to the body frame 2, may be inserted into the coupling part 39 of each of the mounting brackets 38 and may be rotatably coupled thereto.

Referring to FIG. 6, two mounting brackets 38 may be fixed to the body frame 2, and the shaft part 36 of the mounting member 35 mounted to the support 31 may be coupled to each of the two mounting brackets 38. Although two mounting brackets 38 are illustrated in FIG. 6, the battery release system of the present disclosure is not limited thereto, and the number of the mounting brackets 38 may be varied. The first mounting part 34 is a structure provided to withstand the weight of the support 31 and the battery pack 1 acting in the direction of gravity, which are seated on the support 31, and may be configured to prevent the up, down, left, and right movements of the support 31 (e.g., vertical and horizontal movement).

Furthermore, the first mounting part 34 may support the support 31 and thus, the support 31 may rotate relative to the body frame 2, and the support 31 may be rotated downwards by the weights of the support 31 and the battery pack 1 when the state of the support locked by the locking device 50 is released. In particular, the support 31 may be rotated while the shaft part 36 of the mounting member 35 rotates in the coupling part 39 of the mounting bracket 38. Meanwhile, the second mounting part 40 may include a seating part 41 disposed on a rear surface of the upper part of the support 31, particularly, on a rear surface of the upper part of the vertical member 33 of the support 31 to protrude rearward therefrom, and a bracket part 43 installed to be fixed to the body frame 2 and supporting the seating part 41, with the seating part 41 seated thereon.

In the exemplary embodiment of the present disclosure, a plurality of seating parts 41 may be installed on the rear surface of the upper part of the vertical member 33, and as illustrated in FIG. 6, each of two seating parts 41 may be installed on opposite sides of the vertical member 33 of the support 31. A holding jaw part 42 having the shape of protruding upwards may be disposed at a front end part of each of the seating parts 41, and the holding jaw part 42, together with the holding end part 45 of the strap 44, may be locked to the hook 53 of the locking device 50 by being held thereby.

The holding jaw part 42 may be formed on an upper surface of the seating part 41 to have the shape of protruding upwards perpendicularly to the upper surface thereof, and the holding end part 45 of the strap 44 may also have the shape of being bent perpendicularly to the end part of the strap 44 at the end part thereof. Accordingly, the holding jaw part 42 of the seating part 41 and the holding end part 45 of the strap 44 may be combined with each other while the holding jaw part 42 and the holding end part 45 are in close or abutting contact with each other. Accordingly, while the holding jaw part 42 of the seating part 41 and the holding end part 45 of the strap 44 are in contact with each other, the holding jaw part 42 and the holding end part 45 may be locked to the hook 53 of the locking device 50 by simultaneously being held thereby.

The bracket part 43 may be fixed to the body frame 2, and may support the seating part 41 of the support 31 seated on an upper surface of the bracket part 43 at a lower side of the seating part 41, and as illustrated in FIG. 6, each of the total of two bracket parts 43 may be mounted to opposite sides of the body frame 2. In the exemplary embodiment, a lower surface of the seating part 41 may be formed as a curved surface, and the upper surface of the bracket part 43 may be formed as a curved surface that corresponds to or matches the lower surface of the seating part 41, to which the lower surface of the seating part 41 is joined.

Referring to FIGS. 3 and 5, each of the lower surface of the seating part 41 and the upper surface of the bracket part 43 may be formed into a curved surface having a wavy shape in section. While the lower surface of the seating part 41 is seated on the upper surface of the bracket part 43, the curved surfaces thereof may be joined to each other while being engaged with and in close contact with each other in a greater area than when the lower surface of the seating part 41 and the upper surface of the bracket part 43 are plane surfaces.

As illustrated in the drawings, each of the surfaces of the seating part 41 and the bracket part 43 at which the seating part 41 and the bracket part 43 are joined to each other may have the shape of a curved surface having a wavy shape in section. Accordingly, when the seating part 41 is seated on the upper surface of the bracket part 43, the seating part 41 may be more stably supported by the bracket part 43, and the second mounting part 40 may secure mounting strength to withstand the weights of the support 31 and the battery pack 1. In addition, when the support 31 is rotated due to the unlocking of the support 31 by the locking device 50, the seating part 41 may be more easily and efficiently separated from the upper surface of the bracket part 43 without interruption.

Accordingly, in the present disclosure, the support 31 may be more stably supported and mounted by the first mounting part 34 of the lower side of the body frame 2 and the second mounting part 40 of the upper side thereof. The first mounting part 34 and the second mounting part 40 described above allow sufficient mounting strength to be secured, and allow the support 31 to be efficiently rotated without interruption when the support 31 is unlocked by the locking device 50, and thus, the battery pack 1 may be reliably released from a vehicle.

The configuration of the mounting structure has been described above, and the locking device will be described in detail below. The locking device 50 may be mounted to the body frame 2 and may hold the mounting structure 30 by locking the mounting structure 30 supporting the battery pack 1 to the body frame 2. The locking device 50 may be configured to lock the mounting structure 30 to the body frame 2, and maintain the state of the battery pack 1 mounted to the body frame 2 by the mounting structure 30. Accordingly, the battery release system of the present disclosure may release the battery pack from a vehicle when a fire occurs in the battery pack, and normally mount and secure the battery pack 1 to the body frame 2 using the mounting structure 30 and the locking device 50.

In addition, the locking device 50 may be configured to unlock the mounting structure 30 in response to the control signal of the controller 20. When the mounting structure 30 is unlocked by the locking device 50, as described above, the mounting structure 30 supporting the battery pack 1, particularly, the support 31 of the mounting structure 30 supporting the battery pack 1 may be rotated downwards, and thus, the battery pack 1 may be released from the support 31.

In the exemplary embodiment of the present disclosure, the locking device 50 locking or unlocking the mounting structure 30 may be rotatably mounted to the body frame 2, and may include the hook 53 by which the holding jaw part 42 of the mounting structure 30 is held to be locked thereto, and the actuator 55 fixedly mounted to the body frame 2 and forcibly rotating the hook 53 maintaining the locked state of the holding jaw part 42 to a position of the hook by which the locked state of the holding jaw part may be released.

Further, the hook 53 may be rotatably coupled to a base bracket 51 fixed to the body frame 2. In particular, the actuator 55 may also be fixedly mounted to the base bracket 51. In other words, the hook 53 and the actuator 55 may be installed on the body frame 2 via the base bracket 51. In addition, the base bracket 51 may be provided integrally to the bracket part 43 of the second mounting part 40, and as illustrated in FIG. 6, each of the total of two bracket parts 43 may be formed on the opposite sides of a front surface of the base bracket 51 in the shape of protruding forwards therefrom.

Additionally, the hook 53 locking the holding jaw part 42 formed on the seating part 41 of the second mounting part 40 may be rotatably installed on an upper part of the base bracket 51, and each of the total of two hooks 53 may also be installed on opposite sides of the front surface of the base bracket 51. Accordingly, the hook 53, the seating part 41, and the bracket part 43 may all be installed in the same number. As illustrated in the drawings, each of the two hooks, seating parts, and bracket parts may be installed on the corresponding opposite sides. The base bracket 51, the hook 53, the actuator 55, and the bracket part 43 may be all modularized and simultaneously mounted on the body frame.

Each of the hooks 53 may be formed longitudinally to have a predetermined length, and may be longitudinally arranged along the upper part of the base bracket 51. In particular, a hinge pin 54 disposed at opposite end parts of each of the hooks 5 by protruding therefrom may be rotatably coupled to a support body 52 disposed at the upper part of the base bracket 51 by protruding therefrom. When each of the hooks 53 may be rotated downwards relative to the hinge pin 54, the holding jaw part 42 of the mounting structure 30, that is, the holding jaw part 42 disposed on the seating part 41 of the second mounting part 40 by protruding upwards therefrom, together with the holding end part 45 of the strap 44, may be held by the hook 53 to lock the mounting structure 30 thereto. However, when the hook 53 is forcibly rotated upwards relative to the hinge pin 54 causing the hook 53 to be separated from the holding jaw part 42 while the hook 53 locks the mounting structure 30, the mounting structure 30 may be unlocked.

One actuator 55 may be installed for each hook 53, and may be connected to the corresponding hook 53 to transmit power thereto, with the actuator 55 fixedly mounted to the upper part of the base bracket 51. In the exemplary embodiment of the present disclosure, the actuator 55 may be a motor, the operation of which may be executed in response to the control signal of the controller 20. Particularly, the actuator 55 may be a servo motor. In this case, a drive shaft of the motor 55 may be connected to the hinge pin 54 of the hook 53, and during the operation of the motor, a rotational force of the motor may be transmitted to the hinge pin 54 of the hook 53 via the drive shaft to thus rotate the hook 53.

The motor 55 may be driven by the controller 20 configured to detect a fire occurring in the battery pack 1, and the motor 55 may be configured to forcibly rotate the hook 53 in an unlocking direction thereof. Accordingly, the state of the mounting structure 30 locked to the body frame 2 may be released. When the mounting structure 30 is unlocked, the support 31 of the mounting structure 30 supporting the battery pack 1 may be rotated in a downward direction relative to the first mounting part 34 by the weights of the support 31 and the battery pack 1. Next, the battery pack 1 may be released from a vehicle by falling downwards therefrom due to the weight of the battery pack 1.

When the support 31 of the mounting structure 30 supporting the battery pack is rotated downwards by the heavy weight of the battery pack 1, the battery pack 1 may be released from a vehicle by falling to the ground. In particular, accessory parts such as electric wiring connected to the battery pack may be automatically separated therefrom or the accessory parts, together with the battery pack, may be released from a vehicle, with the accessory parts connected to the battery pack 1.

Accordingly, the configuration of the battery release system according to the exemplary embodiment of the present disclosure has been described. Although the operation state of the battery release system has been described together with the configuration above, the operation state will be summarized again hereinbelow. First, the controller 20 may be configured to detect the fire occurrence of the battery pack 1 by using the signal of the fire detection sensor 10, and output the control signal for removing the battery pack 1 from a vehicle when the vehicle is stopped. Next, the servo motor 55, which is the actuator of the locking device 50, may be driven in response to the control signal of the controller 20 and forcibly rotates the hook 53 upwards. The mounting structure 30 locked by the locking device 50 may then be unlocked.

Particularly, at the same time when the holding end part 45 of the strap 44 is separated from the hook 53, the holding jaw part 42 of the mounting structure 30 may also be separated from the hook 53. Finally, while the support 31 is rotated in the downward direction relative to the first mounting part 34 by the weight of the battery pack 1, the battery pack 1 may be released from the vehicle by falling from the support 31. As describe above, after the battery pack in which a fire occurs has been released from a vehicle, a motor of the vehicle may be operated by the power of another battery pack in which a fire has not occurred, and thus, the vehicle may be moved away from the released battery pack. Accordingly, even when a fire occurs in the battery pack, the fire does not spread to a vehicle, and the vehicle and a driver may be safely protected from the fire.

Although the exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A battery release system, comprising:
    a controller configured to output a control signal to release a battery pack mounted to a body frame to separate the battery pack from the body frame in response to the controller determining that a fire occurs in the battery pack;
    a mounting structure rotatably mounted to the body frame and provided to support the battery pack, the mounting structure being rotated relative to the body frame by weight of the battery pack during the release of the battery pack; and
    a locking device mounted to the body frame, the locking device locking the mounting structure supporting the battery pack to the body frame to hold the mounting structure thereon, and operated to release a locked state of the mounting structure in response to the control signal of the controller to perform the rotation of the mounting structure and the release of the battery pack are performed, wherein the mounting structure includes:
a support supporting the battery pack, and provided to release the battery pack therefrom by being rotated when a locked state of the support by the locking device is released;
a first mounting part rotatably coupling another side portion of the support to the body frame; and
a second mounting part holding one side portion of the support on the body frame while being locked to the locking device and allowing a held state of the support on the body frame to be released during the release of the locked state of the support by the locking device.

2. The battery release system of claim 1, further comprising:
a fire detection sensor configured to detect the fire occurring in the battery pack,
wherein the controller is configured to determine whether the fire occurs in the battery pack based on a signal of the fire detection sensor.

3. The battery release system of claim 1, wherein the support is an L-shaped support in which a horizontal member having a plate shape and a vertical member having a plate shape are connected integrally to each other, with the battery pack being seated on the horizontal member.

4. The battery release system of claim 3,
wherein another side portion of the vertical member is rotatably coupled to the body frame by the first mounting part, and
wherein one side portion of the vertical member is held on the body frame while locked to the locking device, or the held state of the one side portion on the body frame is released when the locked state of the one side portion by the locking device is released.

5. The battery release system of claim 1, wherein the mounting structure further includes:
a plurality of straps connected between the support and the locking device and that surrounds the battery pack, wherein the plurality of straps hold the battery pack on the support while being locked to the locking device, and releases the held state of the battery pack on the support while the strap is separated from the locking device when the locked state of the strap by the locking device is released.

6. The battery release system of claim 5, wherein each of the plurality of straps has a first end coupled to the support and a second end coupled to the locking device to lock the strap thereto.

7. The battery release system of claim 1, wherein the second mounting part includes:
a seating part disposed on one side portion of the support to protrude rearward therefrom and coupled to the locking device to be locked thereto, and
a bracket part disposed to be fixed to the body frame and supporting the seating part, with the seating part seated on the bracket part.

8. The battery release system of claim 7, wherein the seating part includes a holding jaw part disposed thereon to be held by a hook of the locking device, wherein the holding jaw part is configured to be engaged with the hook of the locking device, thereby achieving a locking state of the seating part and locking device.

9. The battery release system of claim 8, wherein one side surface of the seating part is formed as a curved surface, and another side surface of the bracket part is formed as a curved surface to which the one side surface of the seating part is joined, wherein when the seating part is seated on the bracket part, the curved surfaces of the seating part and the bracket part are joined to each other.

10. The battery release system of claim 1, wherein the locking device includes:
a hook rotatably mounted to the body frame, and by which a holding jaw part disposed in the mounting structure is held to be locked thereto; and
an actuator fixedly mounted to the body frame and forcibly rotating the hook maintaining the locked state of the holding jaw part using the control signal output from the controller to a position of the hook by which the locked state of the holding jaw part is released.

11. The battery release system of claim 1, wherein the controller is configured to output the control signal to release the battery pack from the body frame to separate the battery pack from the body frame in response to determining that a vehicle including the body frame is in a stopped state while determining that a fire occurs in the battery pack.

* * * * *